United States Patent
Adachi et al.

(10) Patent No.: US 11,860,457 B2
(45) Date of Patent: Jan. 2, 2024

(54) SUBSTRATE FOR DISPLAY APPARATUS, DISPLAY APPARATUS, AND METHOD OF MANUFACTURING SUBSTRATE FOR DISPLAY APPARATUS

(71) Applicant: Japan Display Inc., Tokyo (JP)

(72) Inventors: Koichiro Adachi, Tokyo (JP); Tetsuya Yamamoto, Tokyo (JP); Seiji Uejima, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/470,431

(22) Filed: Sep. 9, 2021

(65) Prior Publication Data

US 2021/0405397 A1    Dec. 30, 2021

Related U.S. Application Data

(63) Continuation of application No. 15/590,221, filed on May 9, 2017, now Pat. No. 11,143,888.

(30) Foreign Application Priority Data

May 10, 2016 (JP) .................................. 2016-094768

(51) Int. Cl.
G02F 1/01 (2006.01)
G02F 1/1335 (2006.01)
(Continued)

(52) U.S. Cl.
CPC .......... *G02F 1/0102* (2013.01); *G02F 1/0045* (2013.01); *G02F 1/135* (2013.01);
(Continued)

(58) Field of Classification Search
CPC ................. G02F 1/0102; G02F 1/0045; G02F 1/133512; G02F 1/133514; G02F 1/135;
(Continued)

(56) References Cited

U.S. PATENT DOCUMENTS 6,094,247 A     7/2000 Miyazaki et al.
2003/0118922 A1*  6/2003 Hayashi ................ G03F 7/0388
                                                    430/7

(Continued)

FOREIGN PATENT DOCUMENTS

JP     H08-262220    10/1996
JP     2009-229485 A 10/2009
(Continued)

OTHER PUBLICATIONS

Office Action issued in related Japanese Patent Application No. 2016-094768, dated Mar. 24, 2020, and English translation of same. 8 pages.

*Primary Examiner* — Anthony J Frost
(74) *Attorney, Agent, or Firm* — K&L Gates LLP (57) ABSTRACT

According to an aspect, a substrate for a display apparatus includes: a first substrate; a translucent coloring layer that includes a plurality of color regions and that overlaps with the first substrate; a first translucent resin layer that overlaps with the first substrate at boundaries of the color regions; and a light shielding layer that overlaps with the first translucent resin layer on an opposite side to the first substrate side. A width of the light shielding layer in a direction parallel with (Continued)

the first substrate is equal to or smaller than a width of the first translucent resin layer in the parallel direction on a cross section vertical to the first substrate.

6 Claims, 5 Drawing Sheets

(51) Int. Cl.
*G02F 1/00* (2006.01)
*G02F 1/135* (2006.01)
*G02F 1/139* (2006.01)
*G02F 1/1339* (2006.01)
*G02F 1/1333* (2006.01)

(52) U.S. Cl.
CPC ........ *G02F 1/139* (2013.01); *G02F 1/133512* (2013.01); *G02F 1/133514* (2013.01); *G02F 1/13394* (2013.01); *G02F 1/133334* (2021.01); *G02F 1/133357* (2021.01); *G06F 2203/04107* (2013.01)

(58) Field of Classification Search
CPC ............... G02F 1/139; G02F 1/133334; G02F 1/133357; G02F 1/13394; G06F 2203/04107
See application file for complete search history.

(56) References Cited

U.S. PATENT DOCUMENTS

| | | |
|---|---|---|
| 2005/0064305 A1 | 3/2005 | Katagami et al. |
| 2006/0229376 A1 | 10/2006 | Hayashi et al. |
| 2008/0090058 A1* | 4/2008 | Chou ................... G03F 7/0007 427/256 |
| 2009/0027612 A1* | 1/2009 | Tomita ................ G02B 5/3016 349/182 |
| 2011/0249339 A1 | 10/2011 | Horie |
| 2012/0262654 A1 | 10/2012 | Moriwaki |
| 2015/0153596 A1 | 6/2015 | Senokuchi et al. |
| 2015/0205161 A1 | 7/2015 | Okita et al. |

FOREIGN PATENT DOCUMENTS

| | | |
|---|---|---|
| JP | 2012-123287 | 6/2012 |
| JP | 2012-226032 | 11/2012 |
| JP | 2014-174431 A | 9/2014 |
| JP | 2015-138199 | 7/2015 |
| JP | 2015-200774 A | 11/2015 |
| JP | 2016-156890 | 9/2016 |
| WO | WO2010/070929 | 6/2010 |
| WO | WO 2014/178157 | 2/2017 |

* cited by examiner

SUBSTRATE FOR DISPLAY APPARATUS, DISPLAY APPARATUS, AND METHOD OF MANUFACTURING SUBSTRATE FOR DISPLAY APPARATUS

CROSS-REFERENCE TO RELATED APPLICATIONS

The present application is a continuation of U.S. patent application Ser. No. 15/590,221, filed on May 9, 2017, which application claims priority from Japanese Application No. 2016-094768, filed on May 10, 2016, the contents of which are incorporated by reference herein in its entirety.

BACKGROUND

1. Technical Field

The present invention relates to a substrate for a display apparatus, a display apparatus, and a method of manufacturing the substrate for a display apparatus.

2. Description of the Related Art

Display apparatuses that achieve higher pixel density (higher definition) have been demanded. Higher pixel density decreases a pixel pitch, which often causes color mixture. Increasing the width of a light shielding layer (black matrix) prevents the color mixture, but reduces an aperture ratio, thereby deteriorating luminance.

For the foregoing reasons, there is a need for a substrate for a display apparatus that can prevent color mixture and deterioration in luminance, a display apparatus, and a method of manufacturing the substrate for a display apparatus.

SUMMARY

According to an aspect, a substrate for a display apparatus includes: a first substrate; a translucent coloring layer that includes a plurality of color regions and that overlaps with the first substrate; a first translucent resin layer that overlaps with the first substrate at boundaries of the color regions; and a light shielding layer that overlaps with the first translucent resin layer on an opposite side to the first substrate side. A width of the light shielding layer in a direction parallel with the first substrate is equal to or smaller than a width of the first translucent resin layer in the parallel direction on a cross section vertical to the first substrate.

According to another aspect, a display apparatus includes: a substrate for a display apparatus that includes a first substrate; a second substrate that overlaps with the first substrate; and a liquid crystal layer arranged between the substrate for a display apparatus and the second substrate. The substrate for a display apparatus includes a translucent coloring layer that includes a plurality of color regions and that overlaps with the first substrate; a first translucent resin layer that overlaps with the first substrate at boundaries of the color regions; and a light shielding layer that overlaps with the first translucent resin layer on an opposite side to the first substrate side. A width of the light shielding layer in a direction parallel with the first substrate is equal to or smaller than a width of the first translucent resin layer in the parallel direction on a cross section vertical to the first substrate.

According to another aspect, a method of manufacturing a substrate for a display apparatus includes: forming a first translucent resin layer on a first substrate; and forming a light shielding layer that overlaps with the first translucent resin layer after the forming of the first translucent resin layer.

DETAILED DESCRIPTION

The following describes an embodiment of the present invention with reference to the drawings. The disclosure is merely an example, and the present invention naturally encompasses an appropriate modification maintaining the gist of the invention that is easily conceivable by those skilled in the art. To further clarify the description, the width, the thickness, the shape, and the like of each component may be schematically illustrated in the drawings as compared with an actual aspect. However, the drawings merely provide examples, and are not intended to limit interpretation of the invention. The same element as that described in the drawing already discussed is denoted by the same reference numeral throughout the description and the drawings, and detailed description thereof will not be repeated in some cases. In this disclosure, when an element is described as being "on" another element, the element can be directly on the other element, or there can be one or more elements between the element and the other element.

Figure 1:
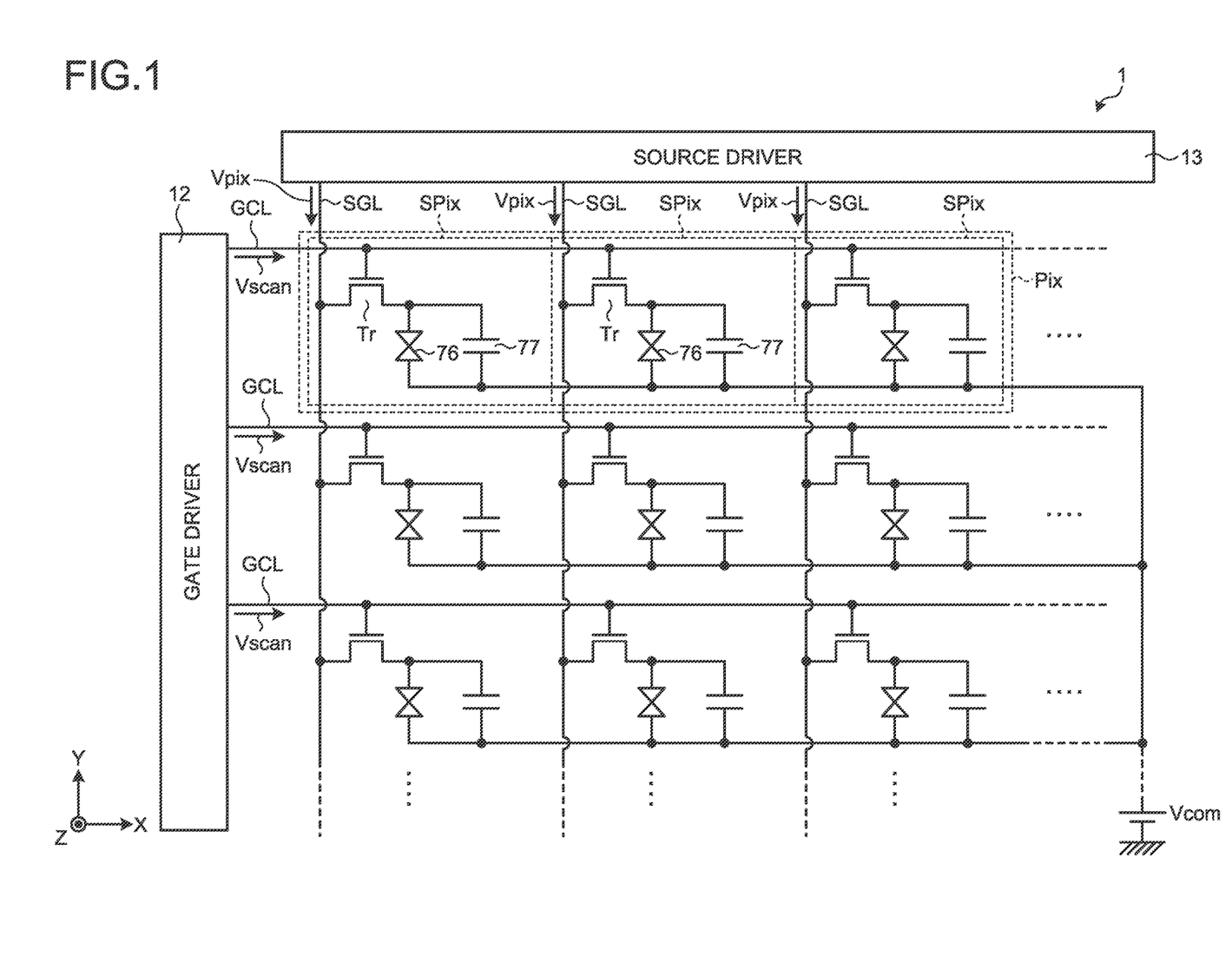
FIG. 1 is a schematic diagram illustrating a display apparatus according to an embodiment.
Figure 2:
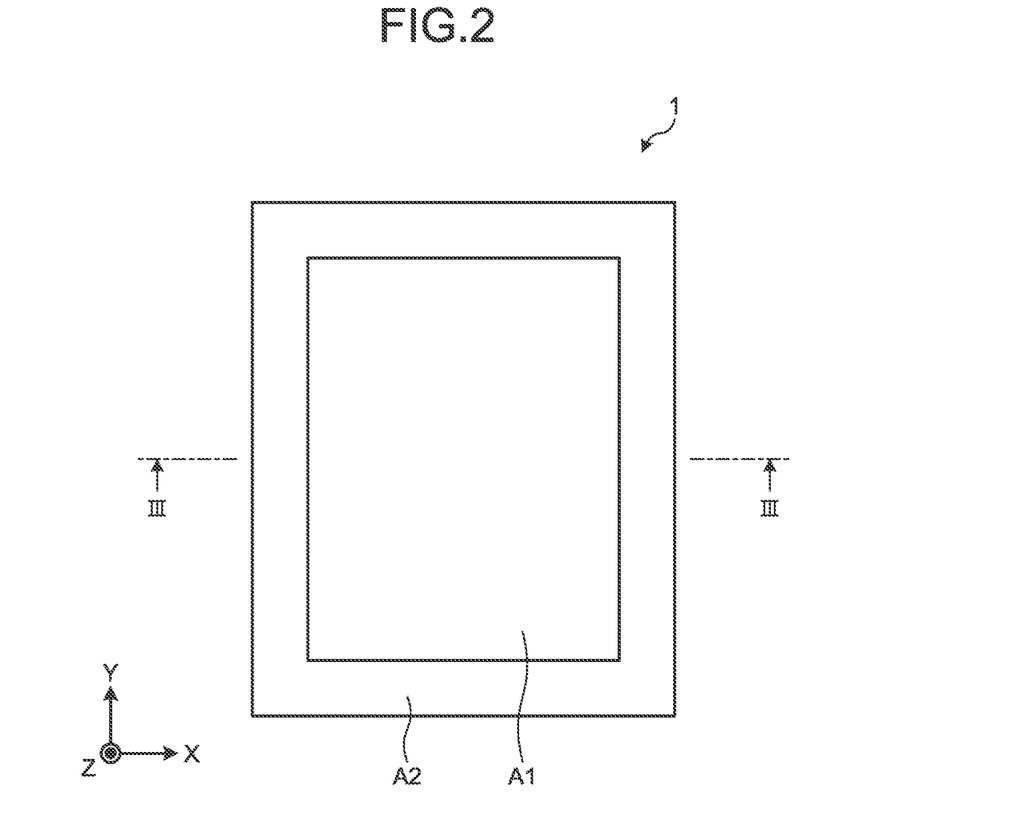
FIG. 2 is a plan view illustrating the display apparatus according to the embodiment.
Figure 3:
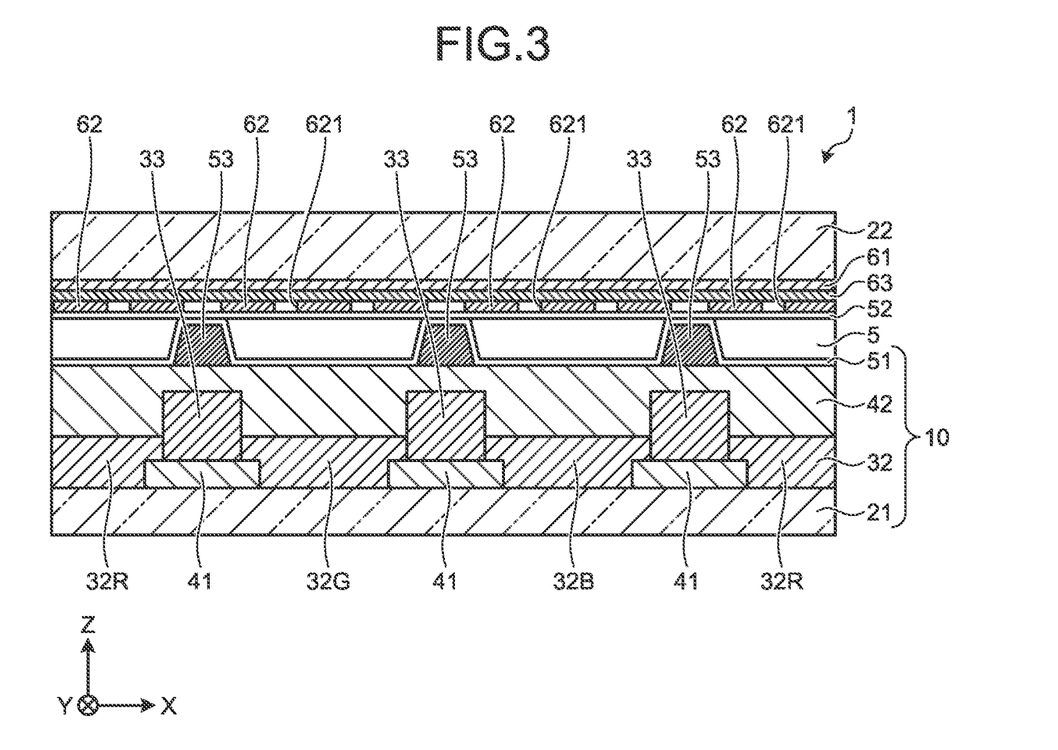
FIG. 3 is a cross-sectional view taken along line III-III in FIG. 2.

FIG. 1 is a schematic diagram illustrating a display apparatus according to an embodiment. FIG. 2 is a plan view illustrating the display apparatus according to the embodiment. FIG. 3 is a cross-sectional view taken along line in FIG. 2. More specifically, FIG. 3 illustrates a cross section obtained by cutting a display apparatus 1 on a plane including middle points of two parallel sides of a rectangular pixel Pix.

The display apparatus 1 is, for example, a liquid crystal display apparatus that can perform color display. The display apparatus 1 is what is called a transmissive liquid crystal display apparatus, for example. As illustrated in FIG. 1, the display apparatus 1 includes a gate driver 12, a source driver 13, a plurality of scanning lines GCL, a plurality of signal lines SGL, and a plurality of pixels Pix. As illustrated in FIG. 3, the display apparatus 1 also includes: a substrate 10 for a display apparatus including a first substrate 21; a second substrate 22; and a liquid crystal layer 5. The substrate 10 for a display apparatus further includes a translucent coloring layer 32, a first translucent resin layer 41, a light shielding layer 33, a second translucent resin layer 42, a spacer 53, and an orientation film 51.

As illustrated in FIG. 1, the scanning lines GCL are arranged on a plane parallel with the first substrate 21. The scanning lines GCL are coupled to the gate driver 12. The signal lines SGL are arranged on a plane parallel with the first substrate 21. The signal lines SGL are coupled to the source driver 13. The signal lines SGL are, for example, orthogonal to the scanning lines GCL. In the following description, used is an XYZ orthogonal coordinate system including the X-axis parallel with the scanning lines GCL, the Y-axis parallel with the signal lines SGL, and the Z-axis orthogonal to the X-axis and the Y-axis.

As illustrated in FIG. 2, the display apparatus 1 includes a display region A1 and a frame region A2. The display region A1 is a region in which light is transmitted through the translucent coloring layer 32, and has a rectangular shape, for example. The display region A1 is also a region in which an image is displayed by pixels Pix. The frame region A2 is a belt-shaped region surrounding the display region A1.

A plurality of pixels Pix are arranged in a matrix in the display region A1 illustrated in FIG. 2. Each pixel Pix includes a plurality of sub-pixels SPix. The number of the sub-pixels SPix included in the pixel Pix is, for example, three. The sub-pixel SPix includes a switching element Tr, a liquid crystal capacitor 76, and a holding capacitor 77. The switching element Tr is, for example, a thin film transistor (TFT). The source of the switching element Tr is coupled to the signal line SGL. The gate of the switching element Tr is coupled to the scanning line GCL. The drain of the switching element Tr is coupled to one end of the liquid crystal capacitor 76 and one end of the holding capacitor 77.

The liquid crystal capacitor 76 indicates a capacity component generated between a counter electrode 61 and a pixel electrode 62. One end of the liquid crystal capacitor 76 is coupled to the drain of the switching element Tr, and a common potential Vcom is supplied to the other end of the liquid crystal capacitor 76. One end of the holding capacitor 77 is coupled to the drain of the switching element Tr, and the common potential Vcom is supplied to the other end of the holding capacitor 77. The holding capacitor 77 is a capacity component for holding a voltage for image display applied between the counter electrode 61 and the pixel electrode 62.

The sub-pixel SPix is coupled to the other sub-pixels SPix belonging to the same row via the scanning line GCL. The gate driver 12 supplies a scanning signal Vscan (refer to FIG. 1) to the switching element Tr via the scanning line GCL. The sub-pixel SPix is coupled to the other sub-pixels SPix belonging to the same column via the signal line SGL. The source driver 13 supplies a pixel signal Vpix (refer to FIG. 1) to the pixel electrode 62 via the signal line SGL.

The gate driver 12 sequentially scans and drives the scanning lines GCL. The gate driver 12 applies the scanning signal Vscan to the gate of the switching element Tr of the sub-pixel SPix via the scanning line GCL to sequentially select one row (one horizontal line) of the sub-pixels SPix as a display driving target. The source driver 13 supplies the pixel signal Vpix to the sub-pixels SPix included in the selected one horizontal line via the signal line SGL. Display is performed in the sub-pixels Spix for each horizontal line in accordance with the supplied pixel signal Vpix.

Figure 4:
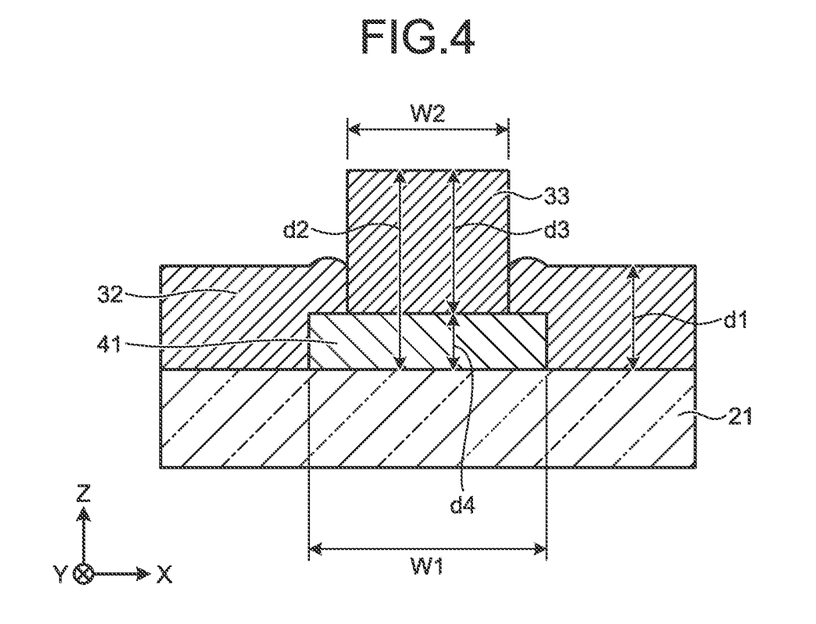
FIG. 4 is an enlarged view of the periphery of a light shielding layer of FIG. 3.
Figure 5:
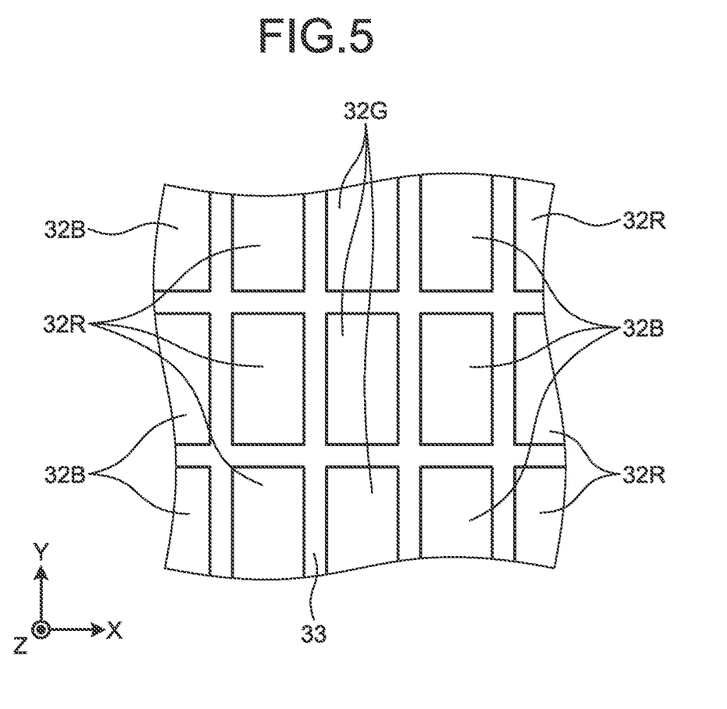
FIG. 5 is a plan view illustrating a display region of the display apparatus according to the embodiment in an enlarged manner.

FIG. 4 is an enlarged view of the periphery of the light shielding layer of FIG. 3. FIG. 5 is a plan view illustrating the display region of the display apparatus according to the embodiment in an enlarged manner.

The first substrate 21 is a substrate made of glass, for example. The translucent coloring layer 32 is a coloring layer including a plurality of color regions (a color region 32R, a color region 32G, and a color region 32B). The translucent coloring layer 32 overlaps with one surface of the first substrate 21. The color region 32R is a red region, the color region 32G is a green region, and the color region 32B is a blue region. As illustrated in FIG. 5, the color regions are arranged in a matrix. For example, the color region 32R, the color region 32G, and the color region 32B are sequentially arranged in the X-direction, and the same color regions are arranged in the Y-direction. That is, a column of color regions 32R arranged in the Y-direction, a column of color regions 32G arranged in the Y-direction, and a column of color regions 32B arranged in the Y-direction are sequentially arranged in the X-direction. In the following description, a direction in which the translucent coloring layer 32 is provided when viewed from the first substrate 21 is represented as +Z-direction.

There is a gap between the color regions adjacent to each other (between the color region 32R and the color region 32G adjacent to each other, between the color region 32G and the color region 32B adjacent to each other, between the color region 32B and the color region 32R adjacent to each other, between adjacent two color regions 32R, between adjacent two color regions 32G, and between adjacent two color regions 32B). That is, the adjacent color regions are not in contact with each other.

The translucent coloring layer 32 is manufactured using a photolithography method, for example. First, for example, a red color resist is applied to the first substrate 21, and the first substrate 21 is caused to spin. After the color resist is dried under reduced pressure, the color resist is irradiated with ultraviolet rays via a mask. Thereafter, the color resist is rinsed to remove an excess portion, and the color resist remaining on the first substrate 21 is cured by baking. The process described above from the application of the color resist to the baking of the color resist is repeated using a green color resist and a blue color resist. This process allows the translucent coloring layer 32 including the color region 32R, the color region 32G, and the color region 32B to be formed on the first substrate 21.

The first translucent resin layer 41 is a transparent layer made of a resin, more specifically, an insulating resin. That is, the first translucent resin layer 41 is a transparent insulating member. The first translucent resin layer 41 overlaps with the first substrate 21 in the +Z-direction at boundaries of the color regions. The first translucent resin layer 41 is positioned at the boundaries of the color regions arranged in a matrix, and thus is arranged in a grid-like manner when viewed in the Z-direction. The first translucent resin layer 41 is made of, for example, a photo-curable resin, which is applied to the first substrate 21 and irradiated with ultraviolet rays to be cured.

The light shielding layer 33 is what is called a black matrix. The light shielding layer 33 overlaps with the first translucent resin layer 41 in the +Z-direction. That is, similarly to the first translucent resin layer 41, the light shielding layer 33 is arranged in a grid-like manner as illustrated in FIG. 5. This configuration allows a path of the light (optical path) passing through the translucent coloring layer 32 in an oblique direction (a direction forming an angle to the Z-axis) to become wider than an optical path when the light shielding layer 33 is formed on the surface of the first substrate 21. The configuration thus improves luminance when the display apparatus 1 is viewed in the oblique direction. The light shielding layer 33 is a single layer, for example. That is, one light shielding layer 33 overlaps with the first substrate 21 both in the display region A1 and the frame region A2, when viewed in the Z-direction.

As illustrated in FIG. 4, a width W2 of the light shielding layer 33 in the X-direction is smaller than a width W1 of the first translucent resin layer 41 in the X-direction. Similarly, the width of the light shielding layer 33 in the Y-direction is smaller than the width of the first translucent resin layer 41 in the Y-direction. The width of the light shielding layer 33 in the Y-direction is not necessarily the same as the width W2. The width W2 is about 3 µm to 4 µm, for example. This width W2 improves an aperture ratio in comparison to a width W2 of the light shielding layer 33 that is larger than a width W1 of the first translucent resin layer 41 to prevent color mixture, and thus improves the luminance. The color mixture is a phenomenon in which light transmitted through adjacent color regions having different colors enters the eyes of a person when the person views the display region A1 in an oblique direction (a direction forming an angle to the Z-axis). Forming the light shielding layer 33 on a flat surface of the first translucent resin layer 41 prevents variations in shape of the light shielding layer 33.

The first translucent resin layer 41 arranged between the light shielding layer 33 and the first substrate 21 is preferably made of a resin having transmittance higher than that of a metal oxide such as indium tin oxide (ITO), for example. Arranging the metal oxide such as ITO in place of the first translucent resin layer 41, for example, may reduce transmittance of the display region A1 when viewed from an observer side (−Z-direction side) of the display apparatus 1.

The smaller width W2 than the width W1 generates a level difference between the light shielding layer 33 and the first translucent resin layer 41, as illustrated in FIG. 4. Failing to fill the level difference generates a gap between the light shielding layer 33 and the translucent coloring layer 32, which may cause light that is not transmitted through the translucent coloring layer 32 to be visually recognized by a person. In the present embodiment, as illustrated in FIG. 4, a part of the translucent coloring layer 32 overlaps with the first translucent resin layer 41 in the +Z-direction. More specifically, the translucent coloring layer 32 is in contact with the light shielding layer 33. This configuration prevents generation of light that is not transmitted through the translucent coloring layer 32.

As illustrated in FIG. 4, a thickness d2 obtained by adding a thickness d4 of the first translucent resin layer 41 to a thickness d3 of the light shielding layer 33 in the Z-direction is larger than a thickness d1 of the translucent coloring layer 32 in the Z-direction. The light shielding layer 33 thus protrudes in the +Z-direction with respect to the translucent coloring layer 32. Arranging the first translucent resin layer 41 at boundaries of the color regions of different colors (between the color region 32R and the color region 32G, between the color region 32G and the color region 32B, and between the color region 32B and the color region 32R) prevents color mixture. The thickness d3 of the light shielding layer 33 is preferably larger than the thickness d1 of the translucent coloring layer 32.

The thickness d1 is, in other words, a distance from the surface in the +Z-direction (the liquid crystal layer 5 side) of the first substrate 21 to the surface in the +Z-direction (opposite side to the first substrate 21 side) of the translucent coloring layer 32. The thickness d2 is, in other words, a distance from the surface in the +Z-direction (the liquid crystal layer 5 side) of the first substrate 21 to the surface in the +Z-direction (opposite side to the first substrate 21 side) of the light shielding layer 33.

The second translucent resin layer 42 is a transparent layer made of a resin, more specifically, an insulating resin. That is, the second translucent resin layer 42 is a transparent insulating member. The second translucent resin layer 42 overlaps with the translucent coloring layer 32 and the light shielding layer 33 in the +Z-direction. The area of the second translucent resin layer 42 is the same as that of the first substrate 21 when viewed in the Z-direction, for example. The second translucent resin layer 42 is made of, for example, a photo-curable resin, which is applied to the translucent coloring layer 32 and the light shielding layer 33, and is irradiated with ultraviolet rays to be cured. Arranging the second translucent resin layer 42 between the light shielding layer 33 and the liquid crystal layer 5 prevents the liquid crystal layer 5 from being contaminated by the light shielding layer 33 and the translucent coloring layer 32.

The spacer 53 is a member for maintaining the thickness (cell gap) of the liquid crystal layer 5. The spacer 53 overlaps with the first translucent resin layer 41 in the +Z-direction. The spacer 53 overlaps with the light shielding layer 33. The spacer 53 is preferably arranged at a crossing portion of the grid-like light shielding layer 33. As illustrated in FIG. 3, the width of the spacer 53 in the X-direction is smaller than the width of the light shielding layer 33. Similarly, the width of the spacer 53 in the Y-direction is smaller than the width of the light shielding layer 33 in the Y-direction.

The orientation film 51 is a film for orienting liquid crystal molecules of the liquid crystal layer 5 in a predetermined direction. The orientation film 51 overlaps with the second translucent resin layer 42 in the +Z-direction.

The second substrate 22 is a substrate made of glass, for example, and is parallel with the first substrate 21. The counter electrode 61, an insulating film 63, and a plurality of pixel electrodes 62 are formed on the second substrate 22. The counter electrode 61 is, for example, a transparent electrode. Specifically, the counter electrode 61 is made of, for example, ITO. The counter electrode 61 overlaps with the second substrate 22 in the −Z-direction. The counter electrode 61 is formed on the surface of the second substrate 22 using a sputtering method, for example. The insulating film 63 overlaps with the counter electrode 61 in the −Z-direction. The pixel electrode 62 is made of, for example, ITO. The pixel electrode 62 is formed on the surface of the insulating film 63 using the sputtering method, for example. The pixel electrode 62 is insulated from the counter electrode 61 by the insulating film 63. The pixel electrodes 62 are arranged in a matrix. One pixel electrode 62 corresponds to one sub-pixel SPix. One pixel electrode 62 includes a plurality of slits 621. An electric field generated between the counter electrode 61 and the pixel electrode 62 acts on the liquid crystal layer 5 via the slit 621. An orientation film 52 is arranged on the pixel electrode 62 in the −Z-direction. For example, a backlight is arranged on the second substrate 22 in the +Z-direction. Light from the backlight sequentially passes through the second substrate 22, the liquid crystal layer 5, and the substrate 10 for a display apparatus, and is emitted toward the first substrate 21 in the −Z-direction.

The liquid crystal layer 5 can change light transmittance in accordance with the state of an electric field. The display apparatus 1 is a display apparatus of a fringe field switching (FFS) system, for example. The electric field of the liquid crystal layer 5 is changed by the counter electrode 61 and the pixel electrode 62.

The display apparatus 1 is not necessarily the display apparatus of the FFS system. For example, the display apparatus 1 may be a display apparatus of a twisted nematic (TN) system, a vertical alignment (VA) system, or an in plane switching (IPS) system. The display apparatus 1 may also be a reflective liquid crystal display apparatus. When the display apparatus 1 is a reflective liquid crystal display apparatus, the display apparatus 1 has a reflective electrode that reflects light as the pixel electrode 62 instead of the transparent electrode, or has a reflective plate and the like on the second substrate 22 in the +Z-direction.

The number of colors of the color regions included in the translucent coloring layer 32 is not limited to three, and may be any number as long as it is plural. For example, the translucent coloring layer 32 may include a white color region in addition to the color region 32R, the color region 32G, and the color region 32B.

The first translucent resin layer 41 and the second translucent resin layer 42 may not be completely transparent as long as they have translucency. It is preferable that change in color of light transmitted through the translucent coloring layer 32 which is caused by the first translucent resin layer 41 and the second translucent resin layer 42 is as little as possible. Thus, the first translucent resin layer 41 and the second translucent resin layer 42 are preferably close to transparent as much as possible.

The width W2 of the light shielding layer 33 is not necessarily smaller than the width W1 of the first translucent resin layer 41, and may be the same as the width W1 of the first translucent resin layer 41 as described in a modification of the embodiment (described later). That is, the width W2 of the light shielding layer 33 may be equal to or smaller than the width W1 of the first translucent resin layer 41. Similarly, the width of the light shielding layer 33 in the Y-direction may be equal to or smaller than the width of the first translucent resin layer 41 in the Y-direction.

Figure 6:
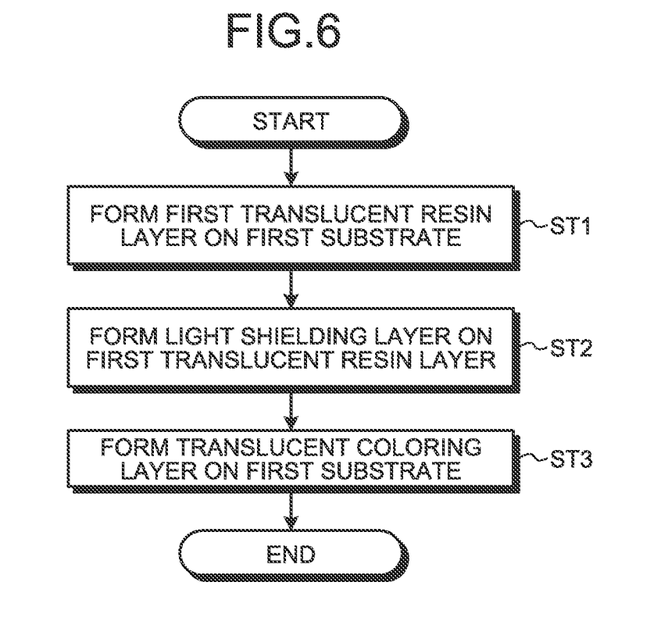
FIG. 6 is a flowchart illustrating a method of manufacturing a substrate for a display apparatus according to the embodiment.

FIG. 6 is a flowchart illustrating a method of manufacturing the substrate for a display apparatus according to the embodiment. The method of manufacturing the substrate 10 for a display apparatus starts with forming the first translucent resin layer 41 on the surface of the first substrate 21 (Step ST1). Specifically, the first translucent resin layer 41 is applied to the surface of the first substrate 21, and then the first translucent resin layer 41 is irradiated with ultraviolet rays, so that the first translucent resin layer 41, which is made of a photo-curable resin, is cured.

After Step ST1, the light shielding layer 33 is formed on the surface of the first translucent resin layer 41 (Step ST2). After Step ST2, the translucent coloring layer 32 is formed on the surface of the first substrate 21 (Step ST3). If the order of forming the layers is the translucent coloring layer 32, the first translucent resin layer 41, and the light shielding layer 33, dimensional accuracy of the translucent coloring layer 32 affects dimensional accuracy of the first translucent resin layer 41 and the light shielding layer 33. In contrast, if the order of forming the layers is the first translucent resin layer 41, the light shielding layer 33, and the translucent coloring layer 32, the first translucent resin layer 41 and the light shielding layer 33 are formed on a flat surface of the first substrate 21. This prevents variations in shape of the first translucent resin layer 41 and the light shielding layer 33.

As described above, the substrate 10 for a display apparatus includes: the first substrate 21; the translucent coloring layer 32 that includes a plurality of color regions (the color region 32R, the color region 32G, and the color region 32B) and that overlaps with the first substrate 21; the first translucent resin layer 41 that overlaps with the first substrate 21 at boundaries of the color regions; and the light shielding layer 33 that overlaps with the first translucent resin layer 41 on the opposite side to the first substrate 21 side. The width W2 of the light shielding layer 33 is equal to or smaller than the width W1 of the first translucent resin layer 41 on a cross section vertical to the first substrate 21. This allows the light shielding layer 33 to protrude toward the liquid crystal layer 5 side from the translucent coloring layer 32, thereby preventing color mixture.

Arranging the first translucent resin layer 41 between the light shielding layer 33 and the first substrate 21 widens the path of the light (optical path) that passes through the translucent coloring layer 32 in the oblique direction (the direction forming an angle to the Z-axis), thereby improving luminance when the display apparatus 1 is viewed in the oblique direction. The width W2 of the light shielding layer that is equal to or smaller than the width W1 of the first translucent resin layer 41 improves an aperture ratio, thereby easily improving the luminance. The substrate 10 for a display apparatus and the display apparatus 1 can thus prevent color mixture and deterioration in luminance.

In the substrate 10 for a display apparatus, the light shielding layer 33 is formed on the surface of the first translucent resin layer 41 instead of the surface of the translucent coloring layer 32. This prevents variations in shape of the light shielding layer 33, thereby allowing the light shielding layer 33 to be easily narrowed. The aperture ratio of the substrate 10 for a display apparatus thus improves, thereby improving transmittance (a ratio of emitted light quantity to incident light quantity) in the display apparatus 1.

Modification

Figure 7:
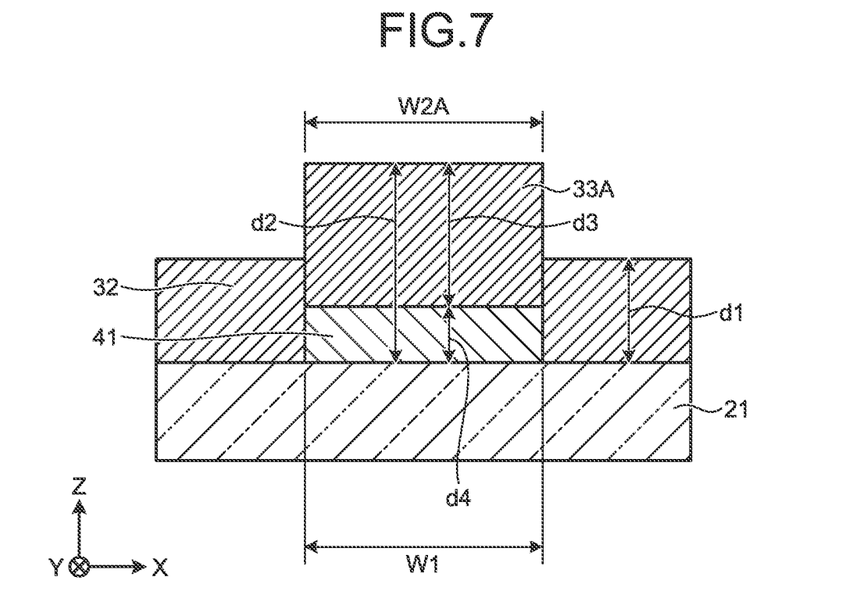
FIG. 7 is a cross-sectional view illustrating the periphery of the light shielding layer in a display apparatus according to a modification of the embodiment in an enlarged manner.

FIG. 7 is a cross-sectional view illustrating the periphery of the light shielding layer in the display apparatus according to the modification of the embodiment in an enlarged manner. In the modification, a width W2A of a light shielding layer 33A in the X-direction is the same as the width W1 of the first translucent resin layer 41 in the X-direction, as illustrated in FIG. 7. The width of the light shielding layer 33A in the Y-direction may be the same as the width of the first translucent resin layer 41 in the Y-direction, or may be smaller than the width of the first translucent resin layer 41 in the Y-direction.

The present invention can naturally provide other advantageous effects that are provided by the aspects described in the embodiment above and are clearly defined by the description in the present specification or appropriately conceivable by those skilled in the art.

What is claimed is:

1. A display apparatus comprising:
   a substrate;
   a light shielding layer that is arranged in a grid-like manner when viewed from the substrate;
   a first translucent resin layer that is formed between the substrate and the light shielding layer, and that is arranged in a grid-like manner on the substrate when viewed from the substrate; and
   a translucent coloring layer that includes a plurality of color regions and that is surrounded by the light shielding layer and the first translucent resin layer on the substrate,
   wherein
   a width of the light shielding layer in a direction parallel with the substrate is equal to or smaller than a width of the first translucent resin layer in the direction parallel with the substrate, a thickness of the first translucent resin layer is smaller than a thickness of the translucent coloring layer in a direction vertical to the substrate, and the first translucent resin layer is in direct contact with each of the substrate, the light shielding layer, and the translucent coloring layer.

2. The display apparatus according to claim 1, wherein the first translucent resin layer is between the translucent coloring layer and the substrate at boundaries of the color regions.

3. The display apparatus according to claim 1, wherein the substrate is made of glass.

4. The display apparatus according to claim 1, further comprising a second translucent resin layer that covers the light shielding layer and the translucent coloring layer, wherein the light shielding layer, the translucent coloring layer, and the first translucent resin layer are between the second translucent resin layer and the substrate.

5. The display apparatus according to claim 1, wherein a sum of the thickness of the first translucent resin layer and a thickness of the light shielding layer in the direction vertical to the first substrate is larger than the thickness of the translucent coloring layer in the vertical direction.

6. The display apparatus according to claim 1, wherein a thickness of the light shielding layer in the direction vertical to the first substrate is larger than the thickness of the translucent coloring layer in the vertical direction.

* * * * *